UNITED STATES PATENT OFFICE.

TOM COBB KING, OF MARION, ALABAMA, ASSIGNOR TO NATIONAL METALLURGIC COMPANY, OF JERSEY CITY, NEW JERSEY, A CORPORATION OF NEW JERSEY.

NODULE OF METALLIFEROUS MATERIAL.

No. 799,910.     Specification of Letters Patent.     Patented Sept. 19, 1905.

Application filed May 4, 1905. Serial No. 258,894.

*To all whom it may concern:*

Be it known that I, TOM COBB KING, a citizen of the United States, residing at Marion, in the county of Perry and State of Alabama, have discovered or invented a new and useful Improvement in Nodules of Metalliferous Material, of which the following is a description.

My invention relates to a new and improved article of manufacture for use in all kinds of smelting operations, and particularly to the smelting of iron ores in blast-furnaces and open-hearth practice.

In substantially all forms of metallurgical operations a large variety of valuable ores are found which exist in such a fine state of division that the same cannot be used in practice, for the reason that the same when used in a blast-furnace clog the blast-pressure, blow over into the flues, and lying together in a compact body prevent the percolation of reducing-gases and when in a semifluid condition cling to the lining of the furnace employed. Many ores exist containing water of combination, also hydroscopic water or water absorbed, which also require much fuel in treatment and are bulky in character. Moreover, many valuable ores which exist in a fine state of division contain arsenic, sulfur, selenium, tellurium, and other impurities which render them difficult of treatment and which if the impurities aforesaid could be eliminated would be very much more valuable for use and practice. Other metalliferous bodies, such as "flue-dust" and "pyritic cinder," are when purified and converted into nodules made fit for blast-furnace and open-hearth practice. Heretofore in the preparation and treatment of this character of ores and metalliferous bodies for commercial use such ores and metalliferous bodies have been converted into small bodies or nodules. The nodules when produced were, however, of no practical value in blast-furnace and open-hearth practice, owing to the fact that although nodulized they still retained the impurities contained in the unnodulized materials plus the binder employed in massing the same. In other words, the substance employed to bind or mass the materials in converting the same into nodules combined or united with the impurities contained in the materials to form stable sulfur compounds, which, with the binder, remained in and contaminated the nodules, rendering the same unfit for use. Further, the nodules were not anhydrous—*i. e.*, non-absorbent of moisture—but were, on the contrary, capable of absorbing a very considerable percentum of moisture, which in blast-furnace and open-hearth practice required fuel to expel, and, finally, the quantity of metalliferous material contained in the nodule was lessened to the extent of non-metalliferous material contained therein, such as the binder substance, impurities, and moisture.

The object of this invention is to produce from such ores and metalliferous bodies nodules of any desirable size, controllable at the will of the operator, substantially free from impurities, porous in character, but anhydrous or non-absorbent of moisture, and, finally, nodules that will contain the greatest possible percentum of metalliferous material.

In an application filed by me in the United States Patent Office on November 14, 1904, Serial No. 232,555, I have described at length a process for manufacturing the article which forms the subject of the present application. This process consists, briefly stated, in making or producing from masses of materials of the character above described nodules of any desired size, controllable at the will of the operator, by means of the use of a binder adhesive at low temperatures or approximately below 600° Fahrenheit, which is preferably reducing in character and which is volatile at a fairly moderate temperature or approximately 1,200° Fahrenheit and combines or reacts with such impurities as sulfur, arsenic selenium, tellurium, and other similar sub stances and is with said impurities eliminatec from the materials at said last-mentionec temperature and when subjected to a highe requisite temperature produces nodules hav ing the characteristics above specified.

These nodules may be produced by an; process by which the metalliferous material can be treated with an adhesive-substanc binder of the character above described an at the same time subjected to agitation an the requisite temperatures necessary to ac complish the result; but preferably the proc ess of producing these nodules is that de scribed in the aforesaid application, in whic it is effected by means of applying the adhe sive substance to the materials to be treatec preferably in a rotary kiln; but any other apparatus in which the desired results can be accomplished may be employed. In practice the material is fed into one end of the kiln, which is slightly higher than the lower end, which kiln is rotated at any desired speed by any desired mechanical means and is subjected in the kiln to any desired degree of heat. The adhesive substance is fed into the kiln in any convenient way, and the product is discharged into a suitable cooling-tower to be cooled in any convenient way. The size of the nodules are controlled by the quantity of the adhesive binder used and the rapidity of agitation to which the material is subjected. The nodules thus formed are substantially free from impurities, contain the greatest possible per centum of metalliferous material, are porous in structure, but, nevertheless, of such a nature that they will not absorb moisture or liquids, and are practically anhydrous, and hence will exist in a structurally perfect state. As a result they may be readily transported and when smelted in a blast-furnace will not require as much fuel and blast to reduce them as they would if they had remained in the form of finely-divided ore with its combined and absorbed water, and as a result the capacity of the furnace by the use of this product will be increased and the expense of fuel consumed will be very much lessened per ton of product produced. Furthermore, this product is in such form that all the disadvantages referred to above upon the use of finely-divided ores and metalliferous bodies containing impurities are obviated, and the product is of such physical structure that it is able to hold all the burden of superincumbent mass of the blast-furnace, does not become pulverized or powdered, and thereby prevents slips, explosions, and irregular working of the furnace, all of which are most annoying and costly in practice.

I claim as my invention or discovery and desire to secure by Letters Patent—

As a new article of manufacture, a permanently anhydrous and porous nodule made from finely-divided metalliferous materials and composed of metals in the form of oxid cohered by partial fusion and uncontaminated by any foreign deleterious substance.

In testimony whereof I have hereunto signed my name in the presence of two subscribing witnesses.

TOM COBB KING.

In presence of—
CLARENCE A. WILLIAMS,
JOHN H. RONEY.